United States Patent
Choe

(10) Patent No.: US 8,570,537 B1
(45) Date of Patent: Oct. 29, 2013

(54) METHOD FOR BORE CHAMFER MEASUREMENT

(71) Applicant: Nissan North America, Inc., Franklin, TN (US)

(72) Inventor: Seunghun Ryan Choe, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/661,832

(22) Filed: Oct. 26, 2012

(51) Int. Cl.
*G01B 11/14* (2006.01)

(52) U.S. Cl.
USPC .......................................................... 356/625

(58) Field of Classification Search
USPC ...................................... 356/601, 625, 241.1
See application file for complete search history.

(56) References Cited

U.S. PATENT DOCUMENTS

| | | | |
|---|---|---|---|
| 7,727,645 B2 * | 6/2010 | Fukushima et al. | 428/846.9 |
| 8,064,072 B2 | 11/2011 | Schmitt et al. | |
| 8,085,388 B2 | 12/2011 | Kaufman et al. | |
| 8,087,477 B2 | 1/2012 | Sullivan et al. | |
| 8,184,301 B2 | 5/2012 | Benz et al. | |
| 8,185,344 B2 | 5/2012 | Troxler et al. | |
| 8,233,665 B2 | 7/2012 | Nakatsukasa | |
| 2009/0226767 A1 * | 9/2009 | Fukushima et al. | 428/848.2 |

OTHER PUBLICATIONS

R. Pezzoni, R. Krupka, Laser-Shearography for Nondestructive Testing of Large Area Composite Helicopter Structures, 15th World Conference on Nondestructive Testing Roma (Italy) Oct. 15-21, 2000.

* cited by examiner

*Primary Examiner* — Roy M Punnoose
(74) *Attorney, Agent, or Firm* — Global IP Counselors, LLP

(57) ABSTRACT

A method for bore chamfer measurement includes providing a wheel with a surface having a bore and chamfer surrounding the bore. A light emitting device is aimed at the bore, the chamfer and a portion of the surface of the wheel adjacent to the chamfer. A light from the light emitting device is emitted to the surface of the wheel at the bore and the chamfer such that at least a portion of the light is emitted in a direction that is aligned with a center of the bore. Reflected light is detected from the surface adjacent to the chamfer and the bore. A two dimensional image of the surface and the chamfer is produced and is used to determine a dimension of the chamfer.

20 Claims, 9 Drawing Sheets

METHOD FOR BORE CHAMFER MEASUREMENT

BACKGROUND

1. Field of the Invention

The present invention generally relates to a method for measuring a chamfer around a bore. More specifically, the present invention relates to measuring the dimensions of a chamfer around a bore of a wheel in a non-destructive manner.

2. Background Information

Current methods of accurately measuring dimensions of a chamfer around a small bore (less than an inch in diameter) include destruction of the metallic member that includes the bore. For example, a metallic vehicle wheel includes a bore that receives a valve stem. The surface of the wheel adjacent to the bore is typically provided with a small chamfer that encircles the bore. The size and shape of the chamfer can be advantageous in the creation of an air tight seal between the bore and sealing surfaces of the valve stem.

One current method for measuring the dimensions of a chamfer around the bore includes cutting the wheel bisecting the bore such that a cross-section of the surfaces around the bore are clearly visible and easy to measure. However, this method requires destruction of the wheel.

In a production line setting, such destructive measurements are costly and time consuming.

SUMMARY

One object of the present invention is to provide a method for accurately measuring a dimension of a chamfer around a bore in a non-destructive manner.

In view of the state of the known technology, one aspect includes a method for bore chamfer measurement, including, providing a wheel with a surface having a bore and chamfer surrounding the bore. The method includes aiming a light emitting device at the bore, the chamfer and a portion of the surface of the wheel adjacent to the chamfer. The method further includes emitting a light from the light emitting device to the surface of the wheel at the bore and the chamfer such that at least a portion of the light is emitted in a direction that is aligned with a center of the bore. Reflected light is detected from the surface adjacent to the chamfer and the bore. A two dimensional image of the surface and the chamfer is produced and is used to determine a dimension of the chamfer.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
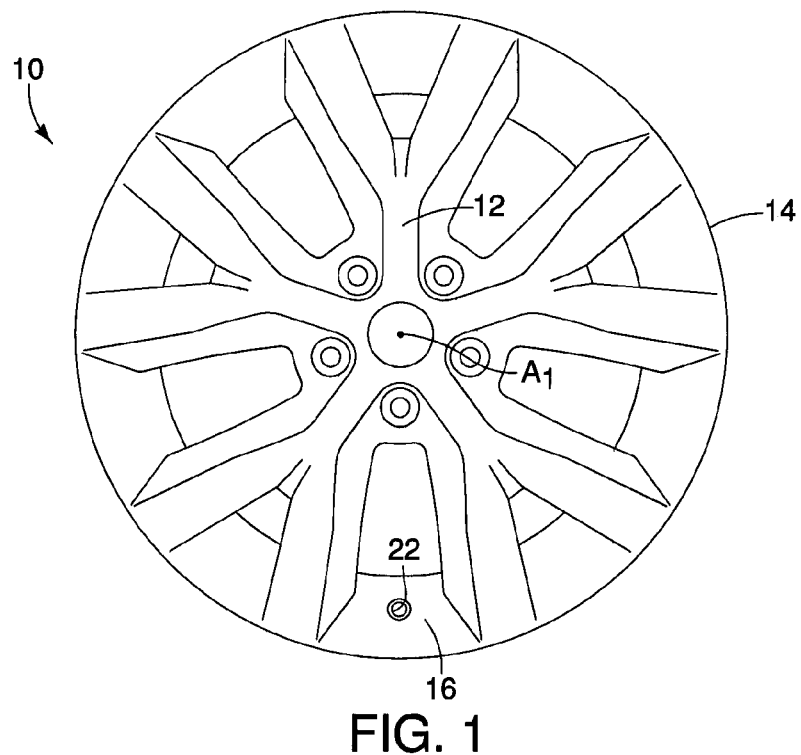
FIG. 1 is a plan view of a vehicle wheel with the tire removed, the vehicle wheel having a valve stem aperture or bore that includes a chamfer on a surface of the vehicle wheel, the chamfer encircling the bore in accordance with various embodiments.
Figure 2:
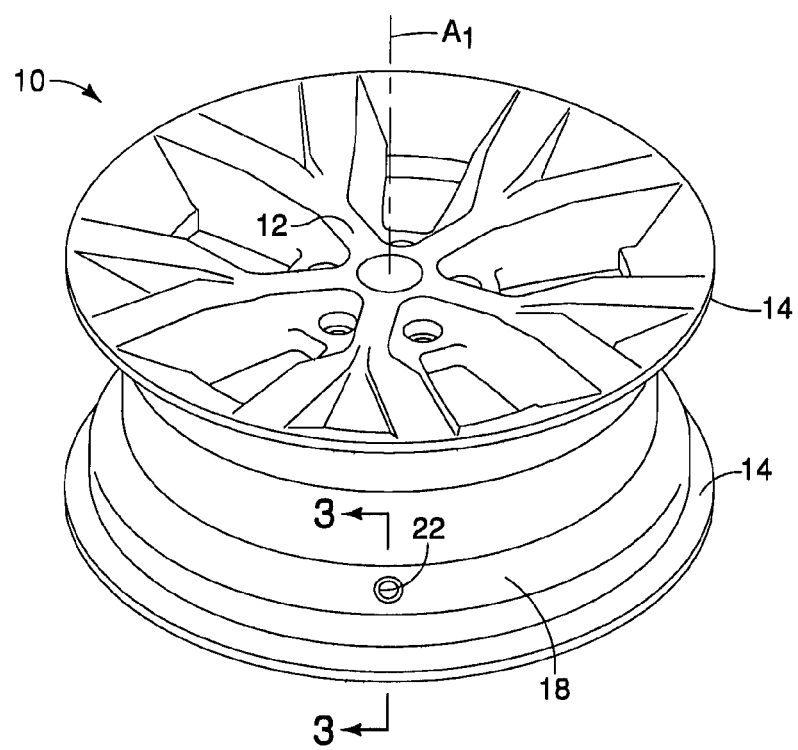
FIG. 2 is a perspective view of the vehicle wheel depicted in FIG. 1, showing the bore and the chamfer in accordance with the various embodiments.

Referring initially to FIGS. 1 and 2, a wheel 10 is illustrated in accordance with a first embodiment. The wheel 10 includes a hub portion 12, rims 14, first surfaces 16 (an outer surface) and a second surface 18 (an inner surface).

The hub portion 12 includes a plurality of apertures that are used to mount the wheel 10 on lug bolts (not shown) of a vehicle (not shown). When the hub portion 12 is installed on the vehicle, the wheel 10 rotates about an axis $A_1$. Since the hub portion 12 is a conventional portion of the wheel 10, further description is omitted for the sake of brevity. The rims 14 define a plurality of surfaces that are dimensioned to retain a bead of a tire (not shown) such that the bead makes air tight contact with surfaces of the rims 14. Since the rims 14 are conventional portions of the wheel 10, further description is omitted for the sake of brevity.

The first surfaces 16 (only one of the surfaces 16 is visible in FIGS. 1 and 2) are outer surfaces of the wheel 10 located radially inward from respective ones of the rims 14, and radially outward from the apertures in the hub portion 12 used to mount the wheel 10 to the vehicle. The first surfaces 16 are also surfaces of the wheel 10 that are typically exposed with the tire installed to the wheel 10, such that a service technician or vehicle operator has access to the first surface 16. The second surface 18 is a surface of the wheel 10 that is concealed by the tire when the tire is installed to the rims 14 of the wheel 10 in a conventional manner. More specifically, the second surface 18 is an annular surface that extends between the two rims 14 of the wheel 10. As indicated in FIG. 2, the second surface 18 has a variety of contours that vary from wheel design to wheel design. The depicted shapes that make up the second surface 18 can be varied from wheel to wheel depending upon the design of the vehicle and the tires that are subsequently mounted to the wheel 10.

Figure 3:
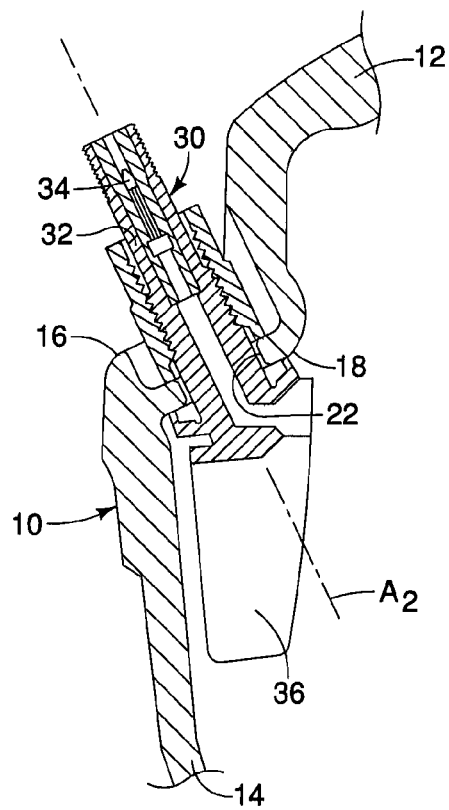
FIG. 3 is a cross sectional view of a portion of the vehicle wheel taken along the lines 3-3 in FIG. 2, showing a valve stem extending through the bore in accordance with the various embodiments.
Figure 4:
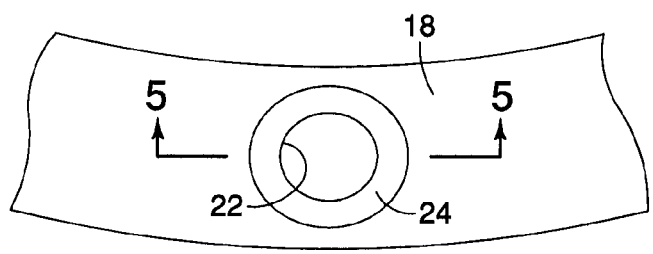
FIG. 4 is a plan view of a surface of the vehicle wheel showing the bore and the chamber in accordance with the various embodiments.
Figure 5:
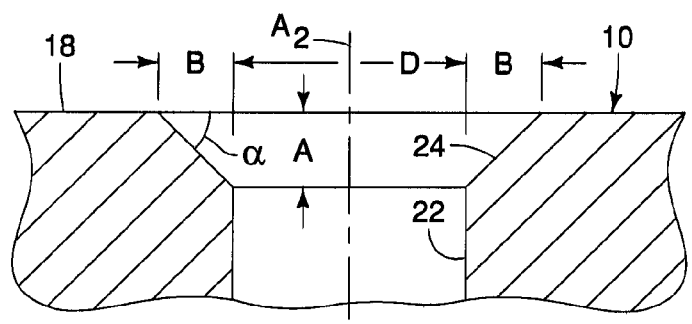
FIG. 5 is a cross sectional view of a portion of the vehicle wheel taken along the lines 5-5 in FIG. 4, showing relative dimensions of the bore and the chamber in accordance with the various embodiments.

As shown in FIGS. 3-5, the wheel 10 is provided with at least one bore 22 that extends through the wheel 10 at a location adjacent to one of the rims 14. The bore 22 further extends completely through the wheel 10, extending from one of the first surfaces 16 to the second surface 18. It should be understood from the drawings and the description herein that the bore 22 can be machined or drilled through either one of the first surfaces 16. It should further be understood from the drawings and the description herein that the wheel 10 can be provided with more than one bore 22, depending upon the design requirements of the vehicle and/or the tire to be mounted on the wheel 10. For example, some wheels 10 can be provided with a bore 22 on either axial side of the wheel 10. However in the depicted embodiment, only one bore 22 is provided in the wheel 10.

The bore 22 is further positioned such that when the tire is installed to the rims 14 of the wheel 10, the bore 22 is spaced apart from the beads of the tire and the bead contacting surfaces of the rims 14. Further, as indicated in FIGS. 3 and 5, a central axis $A_2$ of the bore 22 is perpendicular to the second surface 18.

As shown in FIGS. 4 and 5, the second surface 18 is provided with a chamfer 24 that encircles the bore 22. More specifically, the chamfer 24 is concentric with respect to the bore 22.

In the schematic depiction in FIG. 5, the bore 22 has a diameter D of 11.5 mm and the chamfer 24 has an outer diameter of between 12.1 mm and 12.5 mm. Hence, it should be understood that in FIGS. 4 and 5, the chamfer 24 has been exaggerated to be more visible. In other words, the relative dimensions between the bore 22 and chamfer 24 are accurate in FIGS. 4 and 5. Specifically, the chamfer 24 is shown with exaggerated dimensions it order to provide better identification of the surfaces and dimensions associated with the bore 22 and the chamfer 24.

The surface of the chamfer 24 is also angularly offset or inclined from the second surface 18 by an angle $\alpha$ of 45 degrees. Consequently, the surface of the chamfer 24 is likewise angularly offset or inclined with respect to the cylindrical surface of the bore 22 by 45 degrees (the angle $\alpha$). Therefore, in FIG. 5, the dimensions A and B are equal and are between 0.3 and 0.5 mm.

As shown in FIG. 3, a valve stem 30 is installed to the wheel 10 and extends through the bore 22. The valve stem 30 includes a tube section 32, a valve 34 within the tube section 32 and an optional pressure sensor 36. The tube section 32 extends completely through the bore 22 such that a first end of the tube section 32 extends outward from the first surface 16 and a second end of the tube section 32 extends inward from the second surface 18. The pressure sensor 36 is attached to the second end of the tube section 32 and is located within the tire with the tire installed to the rims 14 of the wheel 10. The pressure sensor 36 includes a small transmitter that transmits air pressure signals to the vehicle. The valve stem 30 and the pressure sensor 36 are conventional devices and therefore further descriptions are omitted for the sake of brevity.

It should be understood from the drawings and the description herein that the dimensions A and B of the chamfer 24 and the diameter D of the bore 22 are not fixed values. Specifically, the dimensions A and B and the diameter D are selected based upon the size and shape of the valve stem 30 and the requirements of the tire mounted to the wheel 10. The above mentioned values of the dimensions A and B, and the diameter D are one example of the overall dimensions of the bore 22 and the chamfer 24. Other dimensions can be provided to the bore 22 and chamfer 24 as needed or desired. The dimensions disclosed herein are one example of the bore 22 and chamfer 24.

The chamfer 24 is provided to assist in ensuring an air tight seal between the valve stem 30 and the bore 22. If the chamfer 24 and its dimensions A and B are not within predetermined tolerances, sealing surfaces of the valve stem 30 may not make air tight contact with the chamfer 24, thereby causing air to slowly leak around the valve stem 30.

Figure 6:
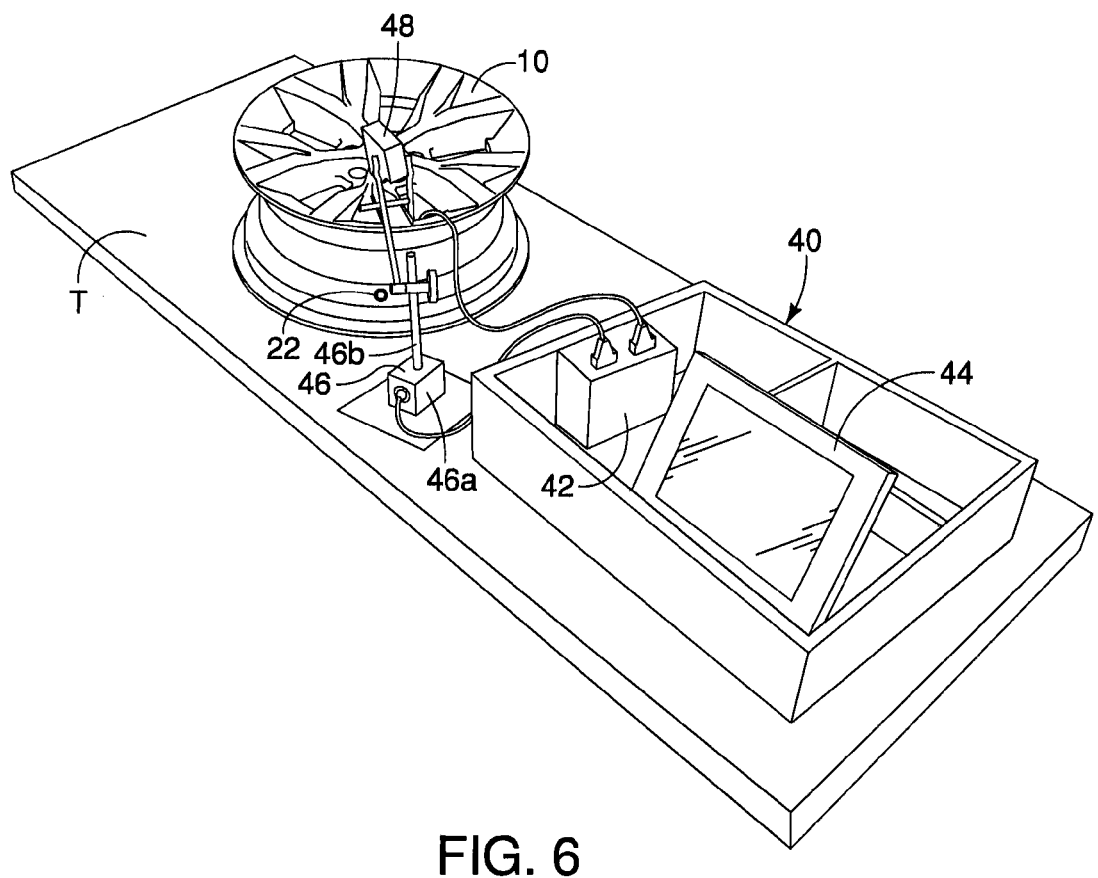
FIG. 6 is a perspective view of a measurement apparatus that includes a laser displacement sensor, a controller and a display in accordance with the various embodiments.

A measurement apparatus 40 is depicted in FIG. 6 and is used to inspect the dimensions of the chamfer 24. A description of the measurement apparatus 40 is now provided with specific reference to FIGS. 6 through 12.

As shown in FIG. 6, the measurement apparatus 40 is positioned on a flat surface, such as a table T. The measurement apparatus 40 includes a controller 42, a display 44, a positioning device 46 and a laser displacement sensor 48.

The controller 42 can be any of a number of electronic devices, such as a personal computer or a microcomputer with a laser measurement control program that processes signals from the laser displacement sensor 48, as discussed below. The controller 42 can also include other conventional components such as an input interface circuit, an output interface circuit, and storage devices such as a ROM (Read Only Memory) device and a RAM (Random Access Memory) device. The microcomputer of the controller 42 is programmed to control the display 44 and display the measurements made by the laser displacement sensor 48 on the display 44. The memory circuit stores processing results and control programs such as ones for processing signals from the laser displacement sensor 48 and operations that are run by the processor circuit. The controller 42 is operatively coupled to the display 44 and the laser displacement sensor 48 in a conventional manner. The internal RAM of the controller 42 stores statuses of operational flags and various control data, including relative dimensional relationships and desired measurements of the bore 22 and the chamfer 24.

For example, as is discussed in greater detail below, the internal RAM of the controller 42 and/or storage devices of the controller 42 stores a still image of a cross-sectional view of the wheel 10 at the bore 22, including the chamfer 24, such that an image generated by the controller 42, based upon measurements made by the laser displacement sensor 48 are displayed on the display 44 along with the still image of the cross-section of the wheel 10. Thus, the measured dimensioned of the bore 22 and the chamfer 24, can be visually compared with the still image of the cross-section of the wheel 10, as described in greater detail below.

The internal ROM of the controller 42 stores computer code and/or pre-programed steps for various operations. It will be apparent to those skilled in the art from this disclosure that the precise structure and algorithms for the controller 42 can be any combination of hardware and software that will carry out the functions of the present invention. The controller 42 can alternatively be a custom built processing unit that performs all the functions described herein below.

The display 44 is a conventional device, such as an LCD screen or other similar computer related display that can accurately display captured images and/or data generated by the controller 42.

The positioning device 46 is a manually positioned device that rigidly supports the laser displacement sensor 48 to the positioning device 46. Specifically, movements of the positioning device 46 result in corresponding movements of the laser displacement sensor 48. As depicted, the positioning device 46 includes a base member 46a and an extension arm 46b. The base member 46a is a member with a significant mass. The base member 46a has a mass (several kilograms) that ensures that the base member 46a supports the extension arm 46b with little possibility of being knocked over and is not prone to vibration. The extension arm 46b includes articulating joints to make positioning of the laser displacement sensor 48 relative to the wheel 10 easy and simple.

In an alternative embodiment, the base member is rigidly fixed to the table and the extension arm is augmented to include several articulating joints to make positioning of the laser displacement sensor 48 easy and simple.

Figure 7:
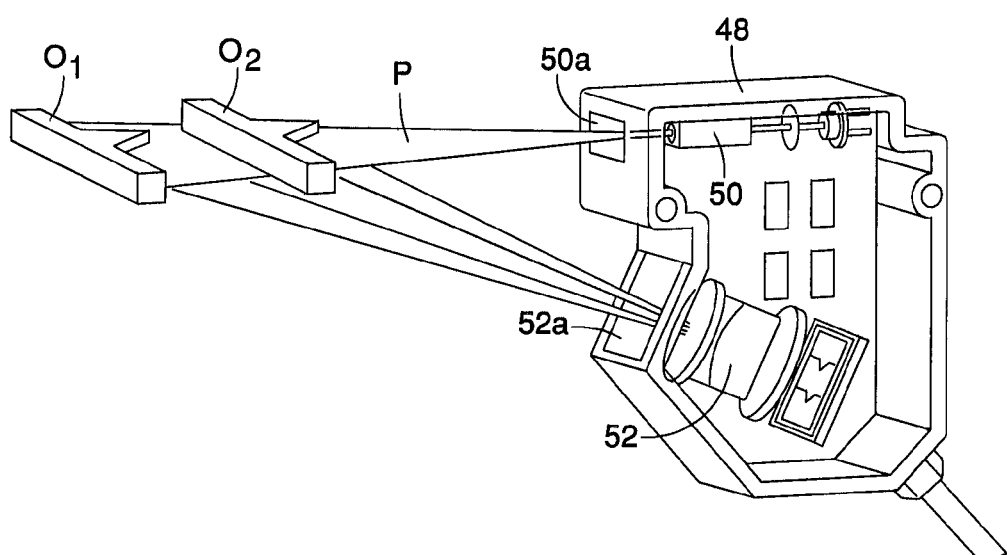
FIG. 7 is a cutaway view of the laser displacement sensor of the measurement apparatus depicted in FIG. 6, showing internal components thereof in accordance with the various embodiments.

As shown in FIG. 7, the laser displacement sensor 48 includes a laser device 50, a first lens 50a, an image capturing device 52 and second lens 52a. The laser device 50 is configured to emit laser light that is confined to a plane P. In other words, a single laser beam is emitted from the laser device 50, but an internal lens or prismatic mechanism (not shown) causes the emitted light beam to linearly oscillate back and forth such that the emitted light is confined to move along the plane P. The naked eye sees a line of light on a target surface.

The emitted light reflects off the target surfaces of the objects $O_1$ and/or $O_2$ and the reflected light penetrates through the second lens 52 and is captured by the image capturing device 52. The captured image is then transmitted to the controller 42 and the captured image displayed on the display 44.

Figure 12:
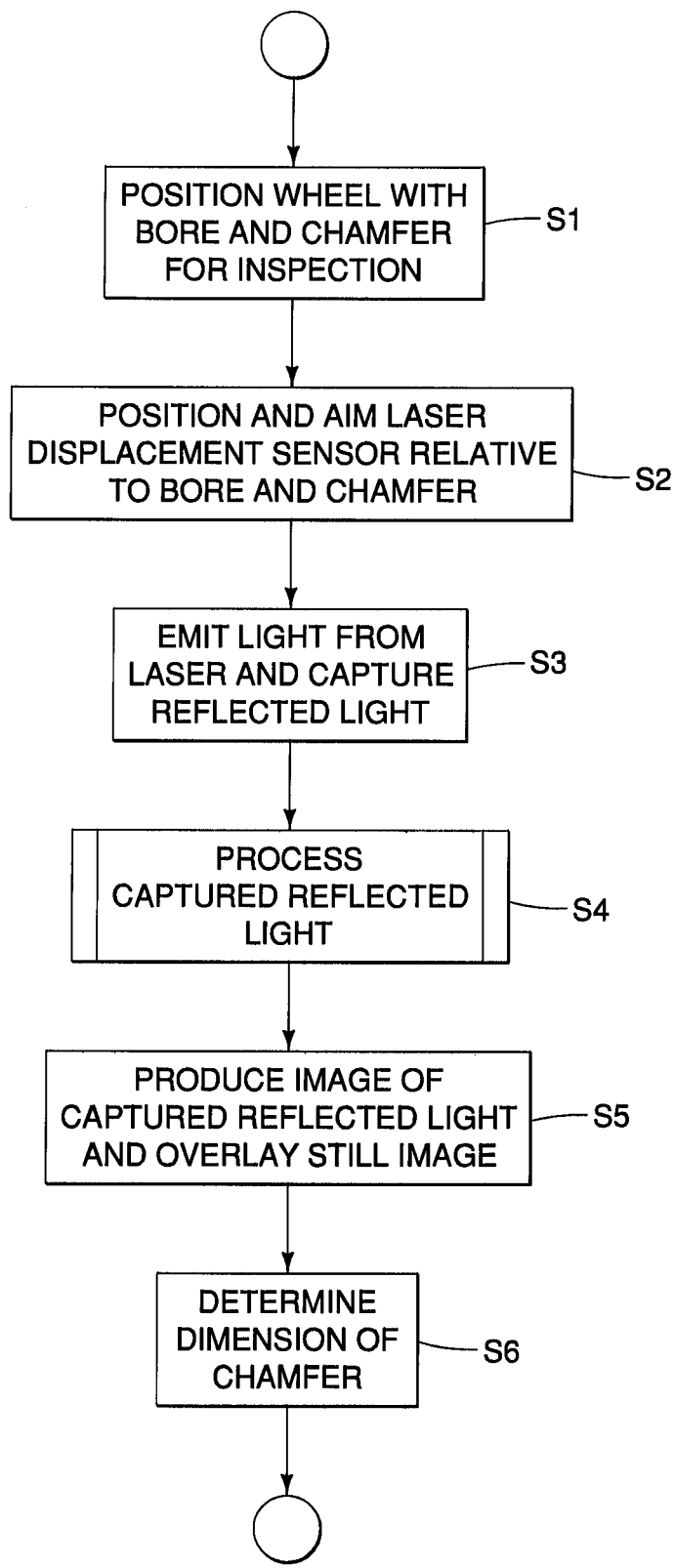
FIG. 12 is a flowchart showing the basic steps for measuring a dimension of the chamfer in accordance with the various embodiments.

The method for measuring at least one dimension of the chamfer 24 is depicted broadly in the flowchart in FIG. 12 and is described now with specific reference to FIGS. 6 and 8-13.

Figure 8:
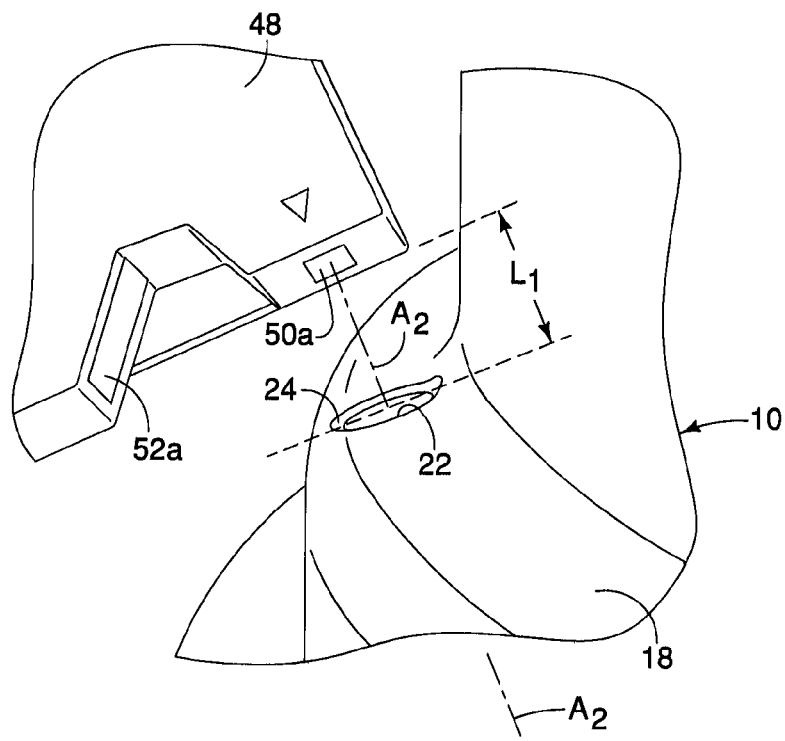
FIG. 8 is a perspective view of the laser displacement sensor of the measurement apparatus being aimed at the chamfer around the bore of the vehicle wheel, in order to capture an image of a surface of the vehicle wheel and the surface of the chamfer in accordance with a first embodiment.

As shown in FIG. 6, the wheel 10 is placed on the table T near the laser displacement sensor 48, as is indicated in step S1 in FIG. 12. As shown in FIG. 8, the laser displacement sensor 48 is then moved into position over the bore 22 of the wheel 10 proximate the surface 18 such that the laser displacement sensor 48 is aimed at the bore 22, as indicated in step S2 of FIG. 12. Preferably, the laser displacement sensor 48 is initially visually aligned with the bore 22 and the chamfer 24 such that the planar light emitted from the laser displacement sensor 48 (or line of line) is centered relative to the bore 22. For desired aiming, the laser displacement sensor 48 is aligned with the center line $A_2$ of the bore 22, such that the plane P of emitted light intersects with the center line $A_2$ of the bore 22.

Once the plane P is brought to a position where it is aligned with or intersects with the center line $A_2$, final aiming of the laser displacement sensor 48 can be accomplished in any of a variety of ways. For example, the operator can first visually observe a distance $L_1$ between the surface 18 and the laser displacement sensor 48, as indicated in FIG. 8. The distance $L_1$ is a predetermined distance that ensures calibration of measurements made by the laser displacement sensor 48. In many instances, visual alignment may be all that is necessary to aim the laser displacement sensor 48 at the bore 22 and the chamfer 24. Additionally, the aiming of the laser displacement sensor 48 can also include detection of mis-alignment by observing captured images from the laser displacement sensor 48 processed by the controller 42 and displayed on the display 44.

Figure 10:
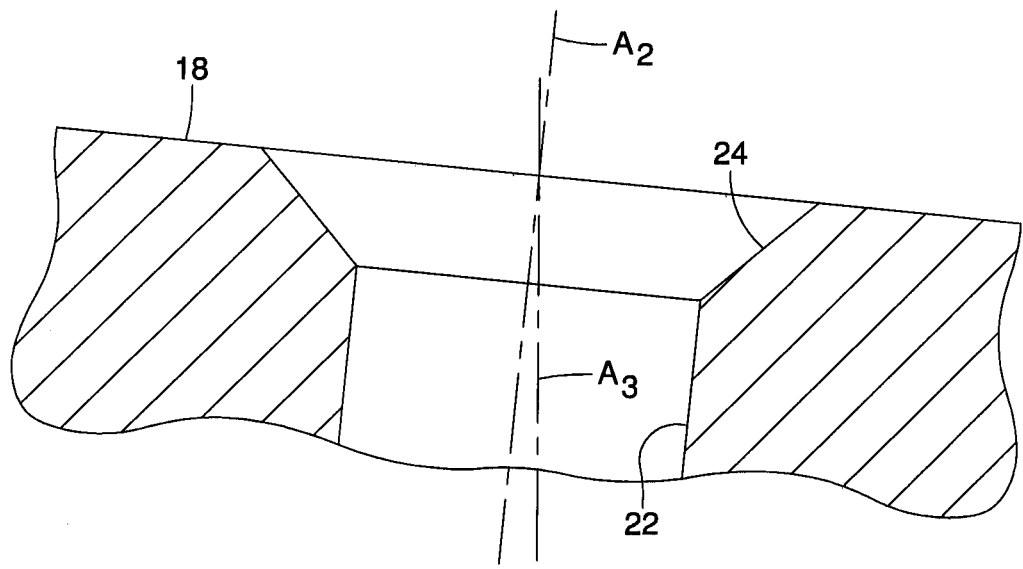
FIG. 10 is another cross sectional view of the portion of the vehicle wheel similar to FIG. 5, showing a mis-aligned light emitted from the laser shining through the bore and along the surface of the chamber in accordance with the various embodiments.
Figure 11:
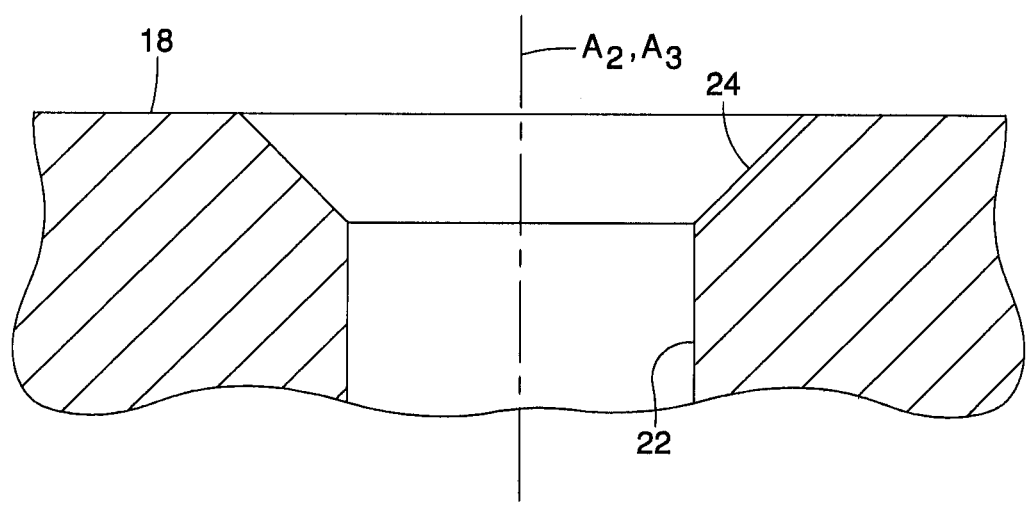
FIG. 11 is another cross sectional view of the portion of the vehicle wheel similar to FIGS. 5 and 10, showing the light emitted from the laser in alignment with a central axis of the bore, with the light shining through the bore and along the surface of the chamfer in accordance with the first embodiment.
Figure 13:
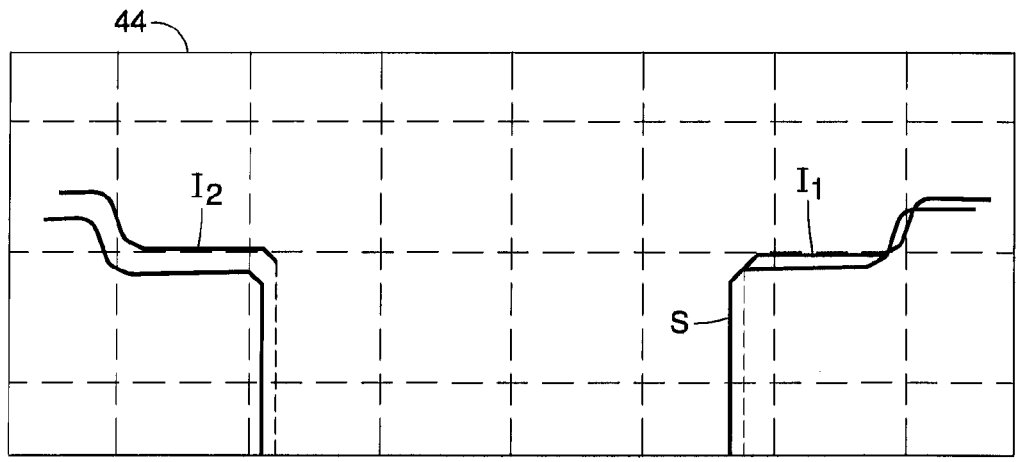
FIG. 13 is rendering of a screen shot shown on a display of the measurement apparatus showing a still image of the area of the wheel around the bore and the chamfer, superimposed over images captured by the laser displacement sensor of the measurement apparatus in accordance with the first embodiment.

For example, if there is an angular mis-alignment between the center line $A_2$ of the bore 22 and a laser beam $A_3$ from the laser displacement sensor 48, as indicated in FIG. 10, an operator can observe images $I_1$ and $I_2$ captured by the laser displacement sensor 48, processed by the controller 42 and displayed on the display 44, as indicated in FIG. 13. The operator can use the images displayed on the display 44 to align the center line $A_2$ of the bore 22 and the laser beam $A_3$ from the laser displacement sensor 48. Specifically, as shown in FIG. 13, a still image S is displayed on the display 44. The still image S is a pre-determined, calibrated image representing a cross-section of the wheel 10 at the bore 22 and the desired relative dimensions of the chamfer 24 relative to the diameter of the bore 22. The operator can make small manual adjustments to the positioning of the laser displacement sensor 48 until the still image S and the captured images $I_1$ and $I_2$ show that they are substantially aligned. If the images line up, then the laser displacement sensor 48 is properly positioned relative to the bore 22 and the chamfer 24. The operator should again confirm the predetermined distance $L_1$ between the surface 18 and the laser displacement sensor 48.

Once the aiming of the laser displacement sensor 48 is established, the operator can proceed with step S3 in FIG. 12. Specifically, the operator can operate the controller 42 such that the laser displacement sensor 48 emits the plane P of laser produced light and capture final images of the surface 18 and the chamfer 24, corresponding to the images $I_1$ and $I_2$ in FIG. 13. In step S3 in FIG. 12, the laser displacement sensor 48 captures reflections from the surface 18 and the chamfer 24 corresponding to the images $I_1$ and $I_2$. The data corresponding to the images $I_1$ and $I_2$ can be obtained one at a time or simultaneously. Specifically, the laser displacement sensor 48 can be positioned to capture one side of the chamfer 24 at a time, or possibly both sides of the chamfer 24, with the plane P of the laser aligned with the center line $A_2$ of the bore 22.

At step S4 in FIG. 12, the controller 42 processes the images produced by the laser displacement sensor 48. At step S5 in FIG. 12, the controller 42 produces the images $I_1$ and $I_2$ on the display 44. The controller 42 further superimposes the still image S on the display 44 overlaying the captured images $I_1$ and $I_2$. As long as the distance $L_1$ (FIG. 8) is established between the surface 18 adjacent to the bore 22 during the measurement step S3, and the laser displacement sensor 48 is properly aligned with the center line $A_2$ of the bore 22, the images produced on the display 44 by the controller 42 will be in calibration with the still image S representing the desired dimensions of the bore 22 and chamfer 24.

At step S6 in FIG. 12, the operator can visually compare the measured dimensions of the chamfer 24, represented by the images $I_1$ and $I_2$, with the still image S of the wheel 10 at the bore 22. Background graduation lines on the display 44 (the grid in FIG. 13) can be used to assist in determining whether or not the dimensions of the chamfer 24 are within desired tolerances or not.

It is also possible for the controller 42 to automatically compare the images $I_1$ and $I_2$, with the still image S of the section of the wheel 10 at the bore 22. The controller 42 can be programmed to compare relative dimensions and angles between the surfaces represented by the images $I_1$ and $I_2$, with the still image S.

It should be understood from the drawings and the description herein that the method for measuring the dimension(s) of the chamfer 24 can include repeated measurements of the chamfer 24, but at, for instance, orthogonal regions around the edges of the bore 22. Multiple measurements of the dimensions of the chamfer 24 will reveal whether or not the chamfer 24 is properly centered about an outer periphery of the bore 22, or is mis-aligned.

Figure 9:
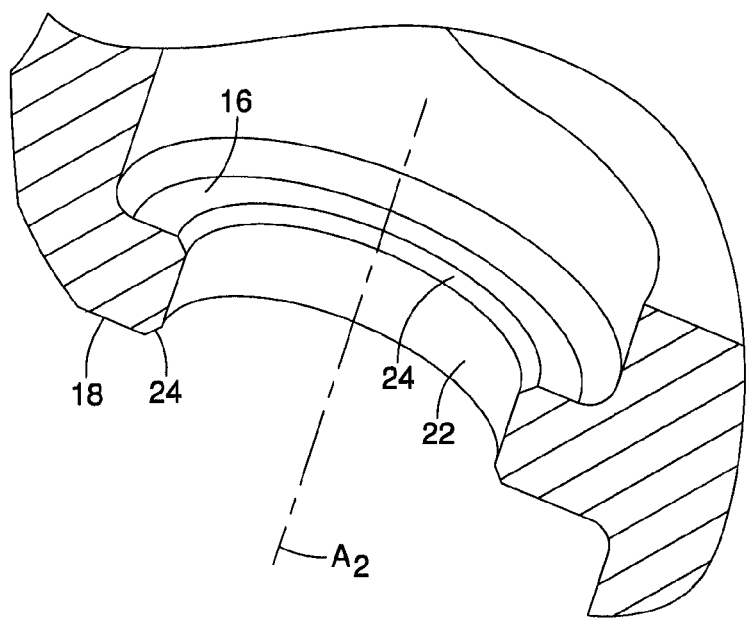
FIG. 9 is a perspective, cross-sectional view of a portion of the vehicle wheel, showing a surface of the bore, the surface of the chamfer and the surface of the vehicle wheel adjacent to the bore and the chamfer in accordance with the various embodiments.

In the description above, the chamfer 24 is described and depicted as being formed along the second surface 18 of the wheel 10 concentric with the bore 22. However as shown in FIG. 9, a second chamfer 24 can be provided along the first surface 16 concentric with the bore 22. The methodology for measuring a dimension or dimensions of the second chamfer 24 are the same as described above, except that orientation of the wheel 10 will be reversed (the wheel 10 will be turned up-side-down relative to the orientation shown in FIG. 6).

Second Embodiment

Referring now to FIGS. 14-18, another method for measuring a dimension of the chamfer 24 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the wheel 10 and the measurement apparatus 40 are identical to those described above in the first embodiment.

In the second embodiment, an alignment member 60 is employed in aiming step S2 of FIG. 12.

Figure 14:
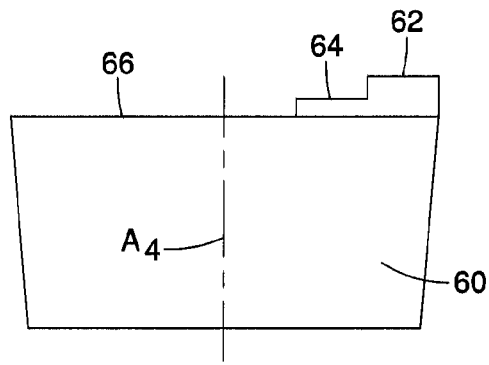
FIG. 14 is a side view of an alignment member that includes a plurality of reference surfaces used to aim the laser displacement sensor at the bore and chamfer of the wheel in accordance with a second embodiment.
Figure 15:
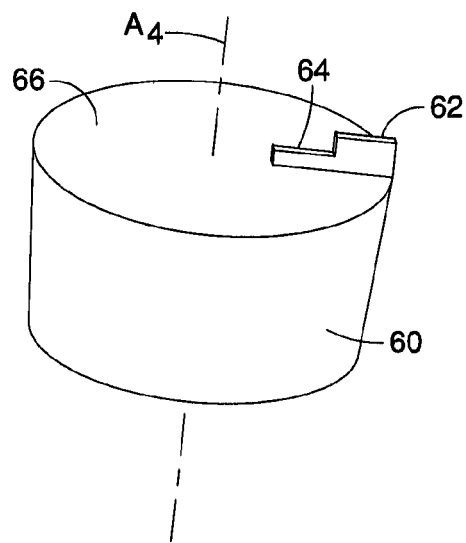
FIG. 15 is a perspective view of the alignment member depicted in FIG. 14 in accordance with a second embodiment.

As shown in FIGS. 14 and 15, the alignment member 60 includes a plurality of alignment marks 62 and 64 that are formed on an upper surface 66 of the alignment member 60. The alignment marks 62 and 64 and the upper surface 66 are finely machined to specific relative dimensions that are also pre-programmed into the controller 42, as discussed further below.

Figure 16:
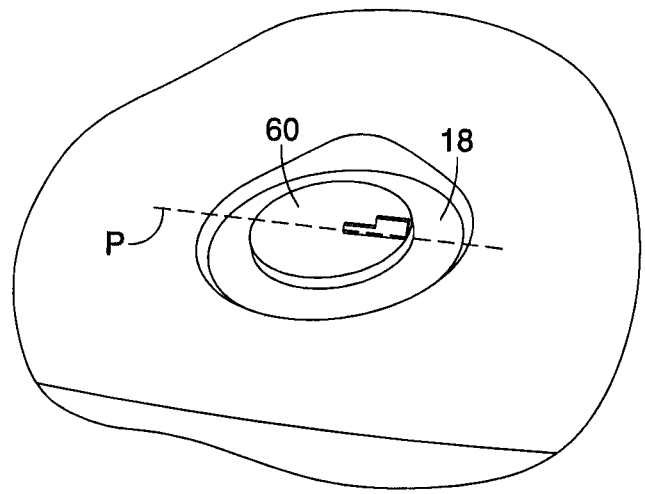
FIG. 16, is a perspective view of a portion of the vehicle wheel showing the alignment member installed in the bore, in accordance with the second embodiment.
Figure 17:
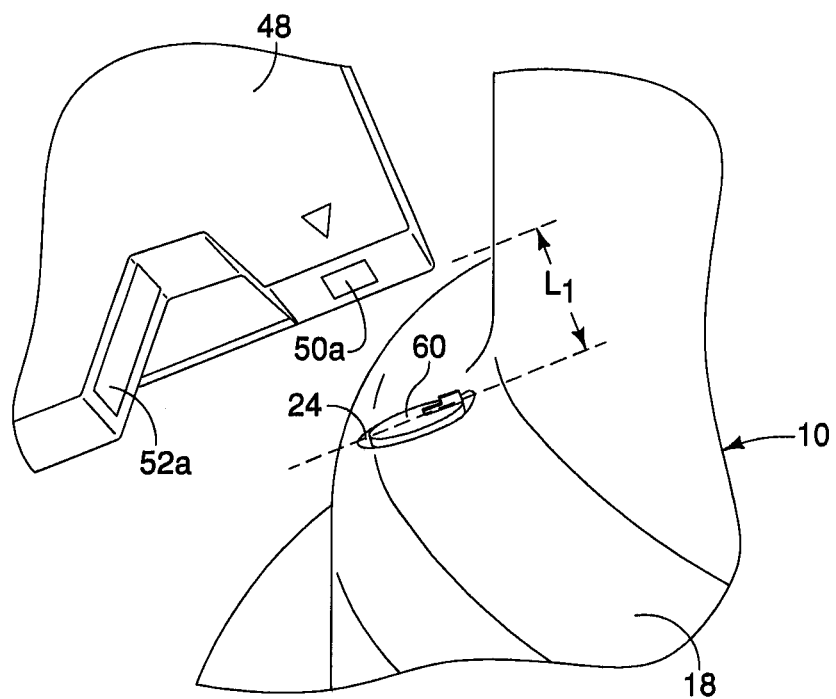
FIG. 17, is a perspective view of the laser displacement sensor of the measurement apparatus being aimed at the alignment member installed in the bore of the vehicle wheel, in accordance with the second embodiment.
Figure 18:
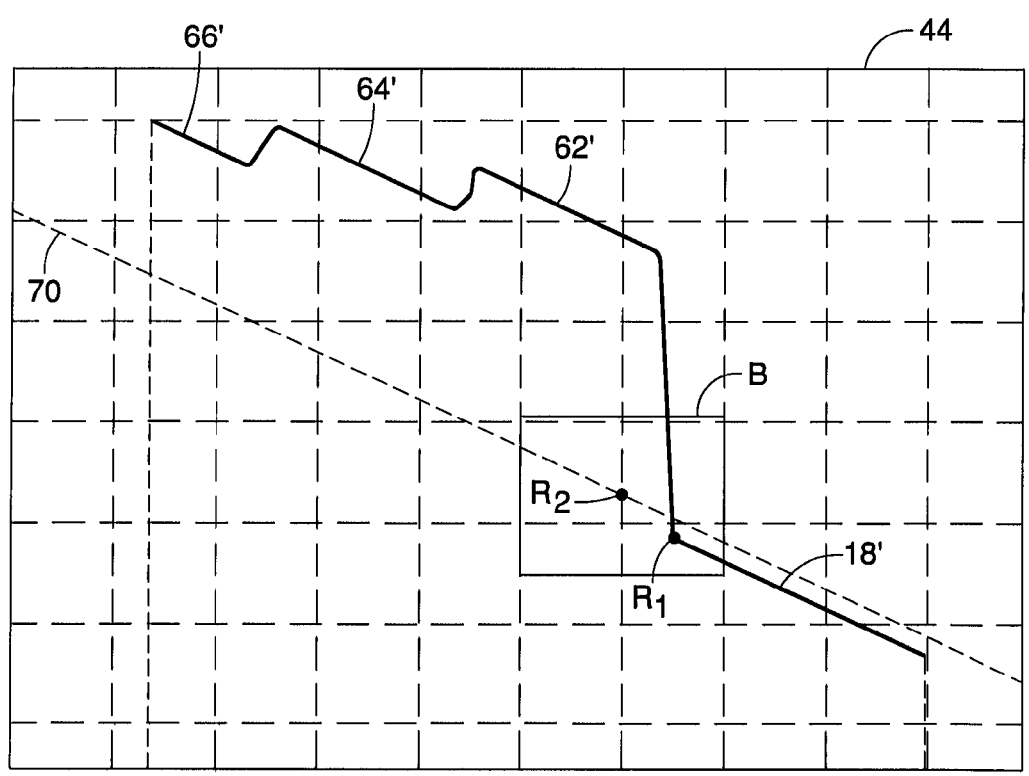
FIG. 18 is rendering of a screen shot shown on the display of the measurement apparatus showing a captured image of the plurality of reference surfaces of the alignment member in accordance with the second embodiment.

The alignment member 60 is basically a tapered cylindrically shaped member that is dimensioned to fit part way into the bore 22, as shown in FIGS. 16 and 17. More specifically, the tapered cylindrical shape of the alignment member 60 is dimensioned to self-center itself within the bore 22, for example, a center axis $A_4$ of the alignment member 60 will be aligned with the center axis $A_2$ of the bore 22. However, the operator must visually inspect the positioning of the alignment member 60 within the bore 22 to confirm that the upper surface 66 is level, compared to the adjacent portions of the surface 18.

As described above with respect to step S2 of FIG. 12, the laser displacement sensor 48 is positioned over the bore 22 and the alignment member 60. The laser displacement sensor 48 emits the plane P of light on the alignment member 60 and is gradually repositioned until the laser displacement sensor 48 is aligned as indicated in FIG. 16. The distance $L_1$ must again be established, as shown in FIG. 17.

In the second embodiment, the aiming step S2 in FIG. 12 is further enhanced by observing a captured image on the display 44 that corresponds to reflections from the alignment marks 62 and 64, the upper surface 66 and the surface 18. In the screen shot of FIG. 18, the display 44 is displaying the captured images or line segments 62', 64', 66' and 18'. These line segments are measured indications of the alignment marks 62 and 64, the upper surface 66 and the surface 18.

The controller 42 is programmed to provide a reference line 70 and a reference box B on the display 44. By observing the images displayed on the display 44, it is possible for an operator to precisely position the laser displacement sensor 48 for accurate measurement of the chamfer 24. Specifically, a first reference point $R_1$ is defined on a portion of the image produced corresponding to a predetermined point on the alignment member 60. In the depicted example, the reference point $R_1$ is located adjacent to the alignment mark 62, which is identified in FIG. 18 as line segments 62'. The operator gradually repositions the laser displacement sensor 48 until the reference point $R_1$ coincides with another reference point $R_2$. The reference point $R_2$ located within the reference box B along the reference line 70. The reference point $R_2$ and the reference line 70 are superimposed onto the display 44 by the controller 42 for the aiming step S2. The reference line 70 and the reference point $R_2$ are pre-programed and calibrated such that with reference point $R_1$ being aligned with the reference point $R_2$, the laser displacement sensor 48 is properly aligned with the bore 18. At this point, the alignment member 60 is removed from the bore 18 and the measurement apparatus 40 can proceed to steps S3 through S6 as described above with respect to FIG. 12.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A method for bore chamfer measurement, comprising:
providing a wheel with a surface having a bore and chamfer surrounding the bore;
aiming a light emitting device at the bore, the chamfer and a portion of the surface of the wheel adjacent to the chamfer;
emitting a light from the light emitting device to the bore, the chamfer, and the surface adjacent to the chamfer such that at least a portion of the light is emitted in a direction that is aligned with a center of the bore;
detecting reflected light from a surface of the bore, the chamfer, and the surface adjacent to the chamfer;
producing a two dimensional image of the surface of the bore, the chamfer, and the surface adjacent to the chamfer; and
determining a dimension of the chamfer.

2. The method according to claim 1, wherein
the providing of the wheel includes the surface and the chamfer being angularly offset from one another.

3. The method according to claim 2, wherein
the providing of the wheel includes the surface and the chamfer being offset from one another by a 45 degree angle.

4. The method according to claim 1, wherein
the aiming of the light emitting device includes aligning a portion of the emitted light parallel to the central axis of the bore in the wheel.

5. The method according to claim 4, wherein
the emitting of the light from the light emitting device includes emitting light along a plane such that the plane intersects with a central axis of the bore in the wheel.

6. The method according to claim 1, wherein
the aiming of the light emitting device includes observing the two dimensional image on a video display, and
adjusting the position of the light emitting device in response to observation of the two dimensional image.

7. The method according to claim 6, wherein
the adjusting of the position of the light emitting device includes aligning the two dimensional image with a predetermined two dimensional still image representing the surface of the bore, the chamfer and the surface adjacent to the chamfer.

8. The method according to claim 1, wherein
the emitting of the light from the light emitting device includes aligning at least a portion of the light in a direction perpendicular to the surface of the wheel.

9. The method according to claim 1, wherein
the detecting of reflected light from the surface of the bore, the chamfer and the surface adjacent to the chamfer includes capturing reflections of the emitted light in an image capturing portion of the light emitting device.

10. The method according to claim 1, wherein
the producing a two dimensional image includes displaying the two dimensional image on a video display.

11. The method according to claim 10, wherein
the determining of the dimension of the chamfer includes superimposing a still image of a desired dimension of the chamfer on the video display.

12. The method according to claim 11, wherein
the determining of the dimension of the chamfer includes comparing displayed relative dimensions of the two dimensional image with displayed relative dimensions of the still image.

13. The method according to claim 1, wherein
the determining of the dimension of the chamfer includes measuring the dimension of the two dimensional image.

14. A method for bore chamfer measurement, comprising:
providing a wheel with a surface having a bore and chamfer surrounding the bore;
coarsely aiming a light emitting device at the bore, the chamfer and a portion of the surface of the wheel adjacent to the chamfer;
emitting a light from the light emitting device to the bore, the chamfer, and the surface of the wheel adjacent to the chamfer;
detecting reflected light from a surface of the bore, the chamfer, and the surface adjacent to the chamfer;
producing a two dimensional image of the surface of the bore, the chamfer, and the surface adjacent to the chamfer;
adjusting the position of the light emitting device in response to observation of the two dimensional image; and
determining a dimension of the chamfer.

15. The method according to claim 14, wherein
the determining of the dimension of the chamfer includes superimposing a still image of a desired dimension of the surface of the bore, the chamfer and the surface adjacent to the chamfer on the two dimensional image.

16. The method according to claim 14, wherein
the determining of the dimension of the chamfer includes comparing displayed relative dimensions of the two dimensional image with displayed relative dimensions of the still image.

17. The method according to claim 14, wherein
the adjusting of the position of the light emitting device includes aligning the light emitting device such that at least a portion of the light is emitted in a direction that is aligned with a center of the bore.

18. A method for bore chamfer measurement, comprising:
providing a wheel with a surface having a bore and chamfer surrounding the bore;
coarsely aiming a light emitting device at the bore, the chamfer and a portion of the surface of the wheel adjacent to the chamfer;
emitting a light from the light emitting device to the bore, the chamfer, and the surface of the wheel adjacent to the chamfer;
detecting reflected light from a surface of the bore, the chamfer, and the surface adjacent to the chamfer;
producing a two dimensional image of the bore, the chamfer, and the surface adjacent to the chamfer;
superimposing a still image of a desired dimension of the chamfer on the two dimensional image;

adjusting the position of the light emitting device in response to observation of the two dimensional image and the still image; and determining a dimension of the chamfer of the two dimensional image.

19. The method according to claim 18, wherein
the determining of the dimension of the chamfer includes comparing displayed relative dimensions of the two dimensional image with displayed relative dimensions of the still image.

20. The method according to claim 18, wherein
the adjusting of the position of the light emitting device includes aligning the light emitting device such that at least a portion of the light is emitted in a direction that is aligned with a center of the bore.

* * * * *